US010372789B2

(12) United States Patent
Pozin

(10) Patent No.: US 10,372,789 B2
(45) Date of Patent: Aug. 6, 2019

(54) CREATING HIGH FIDELITY PAGE LAYOUT DOCUMENTS

(71) Applicant: Oracle International Corporation, Redwood Shores, CA (US)

(72) Inventor: Michael Pozin, Aurora (CA)

(73) Assignee: Oracle International Corporation, Redwood Shores, CA (US)

( * ) Notice: Subject to any disclaimer, the term of this patent is extended or adjusted under 35 U.S.C. 154(b) by 134 days.

(21) Appl. No.: 14/466,358

(22) Filed: Aug. 22, 2014

(65) Prior Publication Data

US 2016/0055136 A1 Feb. 25, 2016

(51) Int. Cl.
G06K 9/46 (2006.01)
G06F 17/21 (2006.01)
G06F 17/22 (2006.01)
G06G 5/00 (2006.01)

(52) U.S. Cl.
CPC .......... *G06F 17/211* (2013.01); *G06F 17/218* (2013.01); *G06F 17/2229* (2013.01); *G06F 17/2264* (2013.01)

(58) Field of Classification Search
CPC ...... G06F 17/24; G06F 17/211; G06F 17/218; G06F 17/2229; G06F 17/2264; G06F 17/2247; G06F 16/24575; G06K 9/46; G06K 2209/01; G09G 5/00
USPC .................. 715/234, 202; 382/112
See application file for complete search history.

(56) References Cited

U.S. PATENT DOCUMENTS

| 8,499,236 | B1* | 7/2013 | Keljo | G09G 5/34 715/243 |
| 9,202,142 | B1* | 12/2015 | Conboy | G06K 9/6267 |
| 2002/0194227 | A1 | 12/2002 | Day et al. | |
| 2005/0006154 | A1* | 1/2005 | Back | G06F 3/017 178/1 |
| 2006/0092480 | A1* | 5/2006 | Cui | G06K 9/2054 358/474 |

(Continued)

FOREIGN PATENT DOCUMENTS

WO 2014012565 A1 1/2014

OTHER PUBLICATIONS

Huegdon'2012: http://nefariousdesigns.co.uk/on-html-element-identifiers.html, copyright 2012, Tim Huegdon.*

(Continued)

*Primary Examiner* — Justin S Lee
(74) *Attorney, Agent, or Firm* — Potomac Law Group, PLLC

(57) ABSTRACT

A computer-based method for creating a high fidelity page layout document is provided. The method includes assigning an identifier to each element of a plurality of elements in a reflowable document, creating a fixed page layout document, including the identifiers, from the reflowable document, parsing the fixed page layout document into a plurality of elements based on the identifiers, each element being associated with an identifier, linking the elements of the reflowable document to the elements of the fixed page layout document based on the identifiers, and creating a final document based on the reflowable document, the fixed page layout document and the identifiers, each element of the final document having a fixed position on a page.

18 Claims, 15 Drawing Sheets

(56) References Cited

U.S. PATENT DOCUMENTS

| | | | |
|---|---|---|---|
| 2006/0200752 A1* | 9/2006 | Sellers | G06F 17/217 715/209 |
| 2007/0189628 A1* | 8/2007 | Nolan | G06K 9/72 382/254 |
| 2009/0276696 A1* | 11/2009 | Kapoor | G06F 16/9577 715/252 |
| 2010/0042915 A1* | 2/2010 | Ohara | G06F 17/248 715/243 |
| 2011/0087712 A1* | 4/2011 | Marquez | G06F 17/5018 707/812 |
| 2011/0289395 A1 | 11/2011 | Breuel et al. | |
| 2012/0029998 A1* | 2/2012 | Aversano | G06Q 30/00 705/14.27 |
| 2012/0041820 A1* | 2/2012 | Simon | G06Q 30/0251 705/14.49 |
| 2013/0047075 A1* | 2/2013 | Cooney | G06F 17/2247 715/234 |
| 2014/0245115 A1* | 8/2014 | Zhang | G06F 17/24 715/202 |
| 2015/0117721 A1* | 4/2015 | Rhodes | G06F 17/21 382/112 |
| 2015/0199314 A1* | 7/2015 | Ratnakar | G06F 17/24 715/255 |
| 2015/0277809 A1* | 10/2015 | Kim | G06F 3/126 358/1.15 |
| 2015/0301989 A1* | 10/2015 | Xin | G06F 17/24 715/234 |

OTHER PUBLICATIONS

"Oracle Fusion Middleware Administrator's Guide for Conversion," 11g Release 1 (11.1.1), Oracle, May 2010. See, e.g., pp. 3-9 to 3-10.

* cited by examiner

```
<?xml version="1.0" encoding="UTF-8" standalone="yes"?>
<w:document
210-s   xmlns:ve="http://schemas.openxmlformats.org/markup-compatibility/2006"
        xmlns:o="urn:schemas-microsoft-com:office:office"
        xmlns:r="http://schemas.openxmlformats.org/officeDocument/2006/relationships"
        xmlns:m="http://schemas.openxmlformats.org/officeDocument/2006/math"
        xmlns:v="urn:schemas-microsoft-com:vml"
        xmlns:wp="http://schemas.openxmlformats.org/drawingml/2006/wordprocessingDrawing"
        xmlns:w10="urn:schemas-microsoft-com:office:word"
        xmlns:w="http://schemas.openxmlformats.org/wordprocessingml/2006/main"
        xmlns:wne="http://schemas.microsoft.com/office/word/2006/wordml">
    <w:body>
220-s   <w:p w:rsidR="00366585" w:rsidRDefault="00366585" w:rsidP="00366585">
            <w:pPr>
                <w:pStyle w:val="heading"/>
                <w:spacing w:before="0" w:beforeAutospacing="0" w:after="150" w:afterAutospacing="0"
                    w:line="300" w:lineRule="atLeast"/>
                <w:rPr>
                    <w:b/>
                    <w:bCs/>                    220-c
                    <w:color w:val="463E3E"/>
                </w:rPr>
            </w:pPr>
            <w:proofErr w:type="gramStart"/>
222-s       <w:r>
                <w:rPr>
                    <w:b/>
                    <w:bCs/>                    222-c
                    <w:color w:val="463E3E"/>
                </w:rPr>
222-e       <w:t>IN CONGRESS, July 4, 1776.</w:t>
            </w:r>                              222-t
            <w:proofErr w:type="gramEnd"/>
220-e   </w:p>
230-s   <w:p w:rsidR="00366585" w:rsidRDefault="00366585" w:rsidP="00366585">
            <w:pPr>
                <w:pStyle w:val="NormalWeb"/>
                <w:spacing w:before="0" w:beforeAutospacing="0" w:after="150" w:afterAutospacing="0"/>
                <w:rPr>
                    <w:color w:val="463E3E"/>
                    <w:sz w:val="20"/>              230-c
                    <w:szCs w:val="20"/>
                </w:rPr>
            </w:pPr>
```

```
       ⋮
232-s ╱ <w:r>
         <w:rPr>
           <w:b/>
           <w:bCs/>
           <w:color w:val="463E3E"/>      ╱ 232-c
           <w:sz w:val="20"/>
           <w:szCs w:val="20"/>
         </w:rPr>
232-e ╲ <w:t>The unanimous Declaration of the thirteen united States of America,</w:t>
        </w:r>                                                                              ╲ 232-t
230-e ╲ </w:p>
240-s ╱ <w:p w:rsidR="00366585" w:rsidRDefault="00366585" w:rsidP="00366585">
         <w:pPr>
           <w:pStyle w:val="NormalWeb"/>
           <w:spacing w:before="0" w:beforeAutospacing="0" w:after="150" w:afterAutospacing="0"/>
           <w:rPr>
             <w:color w:val="463E3E"/>
             <w:sz w:val="20"/>            ╲ 240-c
             <w:szCs w:val="20"/>
           </w:rPr>
         </w:pPr>
242-s ╱ <w:r>
         <w:rPr>                           ╱ 242-c
           <w:color w:val="463E3E"/>
           <w:sz w:val="20"/>
           <w:szCs w:val="20"/>
         </w:rPr>
         <w:t>When in the Course of human events, it becomes necessary for one people to dissolve the
         political bands which have connected them with another, and to assume among the powers of the earth,
         the separate and equal station to which the Laws of Nature and of Nature's God entitle them, a decent
         respect to the opinions of mankind requires that they should declare the causes which impel them to the
         separation.</w:t>
242-e ╱ </w:r>                                                                              ╲ 242-t
240-e ╱ </w:p>
        <w:sectPr w:rsidR="004003D8" w:rsidSect="004003D8">
          <w:headerReference w:type="even" r:id="rId6"/>
          <w:headerReference w:type="default" r:id="rId7"/>
          <w:footerReference w:type="even" r:id="rId8"/>
          <w:footerReference w:type="default" r:id="rId9"/>
          <w:headerReference w:type="first" r:id="rId10"/>
          <w:footerReference w:type="first" r:id="rId11"/>
          <w:pgSz w:w="12240" w:h="15840"/>
          <w:pgMar w:top="0" w:right="1440" w:bottom="0" w:left="1440" w:header="708" w:footer="708"
            w:gutter="0"/>
          <w:cols w:space="708"/>
          <w:docGrid w:linePitch="360"/>
        </w:sectPr>
       </w:body>
       </w:document>
210-e ╱
```

FIG. 4B

```xml
<?xml version="1.0" encoding="UTF-8" standalone="yes"?>
<w:document
  xmlns:ve="http://schemas.openxmlformats.org/markup-compatibility/2006"
  xmlns:o="urn:schemas-microsoft-com:office:office"
  xmlns:r=http://schemas.openxmlformats.org/officeDocument/2006/relationships
  xmlns:m="http://schemas.openxmlformats.org/officeDocument/2006/math"
  xmlns:v="urn:schemas-microsoft-com:vml"
  xmlns:wp="http://schemas.openxmlformats.org/drawingml/2006/wordprocessingDrawing"
  xmlns:w10="urn:schemas-microsoft-com:office:word"
  xmlns:w="http://schemas.openxmlformats.org/wordprocessingml/2006/main"
  xmlns:wne="http://schemas.microsoft.com/office/word/2006/wordml" >
  <w:body>
    <w:p w:rsidR="008856F2" w:rsidRDefault="00B718B2">
      <w:pPr>
        <w:pStyle w:val="heading"/>
        <w:shd w:val="clear" w:color="auto" w:fill="FF0001"/>
        <w:spacing w:before="0" w:beforeAutospacing="0" w:after="150" w:afterAutospacing="0"
          w:line="300" w:lineRule="atLeast"/>
        <w:rPr>
          <w:b/>
          <w:bCs/>
          <w:color w:val="463E3E"/>
        </w:rPr>
      </w:pPr>
      <w:r>
        <w:rPr>
          <w:b/>
          <w:bCs/>
          <w:color w:val="FFFFFE"/>
          <w:shd w:val="clear" w:color="auto" w:fill="00FF02"/>
        </w:rPr>
        <w:t>IN CONGRESS, July 4, 1776.</w:t>
      </w:r>
    </w:p>
    <w:p w:rsidR="008856F2" w:rsidRDefault="00B718B2">
      <w:pPr>
        <w:pStyle w:val="NormalWeb"/>
        <w:shd w:val="clear" w:color="auto" w:fill="FF0002"/>
        <w:spacing w:before="0" w:beforeAutospacing="0" w:after="150" w:afterAutospacing="0"/>
        <w:rPr>
          <w:color w:val="463E3E"/>
          <w:sz w:val="20"/>
          <w:szCs w:val="20"/>
        </w:rPr>
      </w:pPr>
      ...
```

348-s  ⟋<w:r>
         <w:rPr>                        ⟋— 348-c
           <w:color w:val="FFFFFC"/>
           <w:sz w:val="20"/>
           <w:szCs w:val="20"/>                    ⟋— 348-i
           <w:shd w:val="clear" w:color="auto" w:fill="00FF04"/>
         </w:rPr>                                            ⟋— 348-t
348-e ⟍  <w:t xml:space="preserve"> should declare the causes which impel them to the separation.</w:t>
340-e ⟍ </w:r>
        </w:p>
        <w:sectPr w:rsidR="008856F2" w:rsidSect="008856F2">
          <w:headerReference w:type="even" r:id="rId6"/>
          <w:headerReference w:type="default" r:id="rId7"/>
          <w:footerReference w:type="even" r:id="rId8"/>
          <w:footerReference w:type="default" r:id="rId9"/>
          <w:headerReference w:type="first" r:id="rId10"/>
          <w:footerReference w:type="first" r:id="rId11"/>
          <w:pgSz w:w="12240" w:h="15840"/>
          <w:pgMar w:top="0" w:right="1440" w:bottom="0" w:left="1440" w:header="708" w:footer="708"
             w:gutter="0"/>
          <w:cols w:space="708"/>
          <w:docGrid w:linePitch="360"/>
        </w:sectPr>
310-e ⟍</w:body>
       </w:document>
```

FIG. 6C

```
410-s  <FixedPage xmlns="http://schemas.microsoft.com/xps/2005/06"
        Width="816" Height="1056" xml:lang="en-US">
        <Canvas>
         <Canvas.RenderTransform>
          <MatrixTransform Matrix="1.333333333,0,0,1.333333333,0,0"/>
         </Canvas.RenderTransform>
420-s   <Path Data="M 70.584,0 L 541.63,0 L 541.63,22.56 L 70.584,22.56 L 70.584,0 Z ">
         <Path.Fill>
          <SolidColorBrush Color="#FFFF0001"/>
420-e    </Path.Fill>                              420-i
        </Path>
422-ps  <Path Data="M 72.024,0.72 L 224.47,0.72 L 224.47,14.88 L 72.024,14.88 L 72.024,0.72 Z ">
         <Path.Fill>
          <SolidColorBrush Color="#FF00FF02"/>
422-pe   </Path.Fill>                              422-i
        </Path>                                              422-c
422-gs  <Glyphs Name="a0" BidiLevel="0" Fill="#FFFFFFFE"
         FontUri="/Resources/3AE9319A-0099-2F20-7B77-866A3F15F510.odttf"
         FontRenderingEmSize="12" StyleSimulations="None" OriginX="72.024" OriginY="12.24"
         UnicodeString="IN CONGRESS, July 4, 1776."
         Indices=                                  422-t
         ",38;,72;,26;,72;,78;,72;,78;,72;,66;,56;,56;,26;,26;,50;,56;,26;,50;,26;,50;,24;,26;,50;,50;,50;,50;">
422-ge  </Glyphs>
        <Glyphs Name="a1" BidiLevel="0" Fill="#FF463E3E"
         FontUri="/Resources/3AE9319A-0099-2F20-7B77-866A3F15F510.odttf"
         FontRenderingEmSize="12" StyleSimulations="None" OriginX="224.47"
         OriginY="12.24" UnicodeString=" " Indices="">
        </Glyphs>
430-s   <Path Data="M 70.584,22.56 L 541.63,22.56 L 541.63,41.544 L 70.584,41.544 L 70.584,22.56 Z ">
         <Path.Fill>
          <SolidColorBrush Color="#FFFF0002"/>
430-e    </Path.Fill>                              430-i
        </Path>
432-ps  <Path Data="M 72.024,22.08 L 364.22,22.08 L 364.22,34.08 L 72.024,34.08 L 72.024,22.08 Z ">
         <Path.Fill>
          <SolidColorBrush Color="#FF00FF03"/>
432-pe   </Path.Fill>                              432-i
        </Path>                                              432-c
432-gs  <Glyphs Name="a2" BidiLevel="0" Fill="#FFFFFFFD"
         FontUri="/Resources/3AE9319A-0099-2F20-7B77-866A3F15F510.odttf"
         FontRenderingEmSize="10.08" StyleSimulations="None" OriginX="72.024"
         OriginY="31.92"                                     432-t
         UnicodeString="The unanimous Declaration of the thirteen united States of America,"
```

Indices=",66.667;,54.762;,45.238;,26.19;,52.381;,54.762;,50;,54.762;,28.571;,80.952;,50;,54.762;,38.095;, 26.19;,71.429;,45.238;,45.238;,28.571;,47.619;,45.238;,50;,30.952;,28.571;,47.619;,54.762;,26.19;,47.619; ,33.333;,26.19;,33.333;,54.762;,45.238;,26.19;,33.333;,52.381;,28.571;,45.238;,30.952;,45.238;,52 .381;,26.19;,52.381;,54.762;,28.571;,33.333;,45.238;,54.762;,26.19;,54.762;,33.333;,50;,30.952;,45.238;,3
432-e ⟨ 8.095;,23.81;,47.619;,33.333;,26.19;,71.429;,80.952;,45.238;,45.238;,28.571;,45.238;,47.619;">
</Glyphs>
<Glyphs Name="a3" BidiLevel="0" Fill="#FF463E3E"
FontUri="/Resources/2BC653E6-393C-2C0D-AD32-842F083DD225.odttf"
FontRenderingEmSize="10.08" StyleSimulations="None" OriginX="364.22"
OriginY="31.92" UnicodeString=" " Indices="">
</Glyphs>

440-s ⟨ <Path Data="M 70.584,41.544 L 541.63,41.544 L 541.63,53.064 L 70.584,53.064 L 70.584,41.544 Z ">
<Path.Fill>
⟦<SolidColorBrush Color="#FFFF0003"/>⟧ ⟵ 440-i
440-e ⟨ </Path.Fill>
</Path>

444-ps ⟨ <Path Data="M 72.024,40.824 L 539.71,40.824 L 539.71,52.824 L 72.024,52.824 L 72.024,40.824 Z ">
<Path.Fill>
⟦<SolidColorBrush Color="#FF00FF04"/>⟧ ⟵ 444-i
444-pe ⟨ </Path.Fill>
</Path> ⟵ 444-c
444-gs ⟨ <Glyphs Name="a4" BidiLevel="0" ⟦Fill="#FFFFFFFC"⟧
FontUri="/Resources/2BC653E6-393C-2C0D-AD32-842F083DD225.odttf"
FontRenderingEmSize="10.08" StyleSimulations="None" OriginX="72.024" ⟵ 444-t
OriginY="50.424"
⟦UnicodeString="When in the Course of human events, it becomes necessary for one people to dissolve
the "⟧

Indices=",92.857;,52.381;,40.476;,52.381;,23.81;,26.19;,52.381;,23.81;,26.19;,52.381;,42.857;,26.19;,66.6 67;,47.619;,47.619;,35.714;,38.095;,42.857;,26.19;,47.619;,30.952;,26.19;,52.381;,50;,76.19;,42.857;,50;,2 6.19;,42.857;,47.619;,42.857;,52.381;,28.571;,38.095;,26.19;,23.81;,28.571;,26.19;,26.19;,47.619;,42.857;, 45.238;,47.619;,78.571;,42.857;,38.095;,26.19;,52.381;,42.857;,42.857;,38.095;,38.095;,45.238;,3 5.714;,45.238;,28.571;,33.333;,47.619;,35.714;,26.19;,47.619;,52.381;,42.857;,26.19;,50;,42.857;,47.619;, 50;,28.571;,42.857;,26.19;,28.571;,47.619;,26.19;,47.619;,28.571;,38.095;,38.095;,47.619;,28.571;,50;,42.
444-ge ⟨ 857;,26.19;,26.19;,52.381;,42.857;">
</Glyphs> ⟵ 450-c
450-gs ⟨ <Glyphs Name="a5" BidiLevel="0" ⟦Fill="#FFFFFFFC"⟧
FontUri="/Resources/2BC653E6-393C-2C0D-AD32-842F083DD225.odttf"
FontRenderingEmSize="10.08" StyleSimulations="None" OriginX="433.13"
OriginY="50.424"
⟦UnicodeString="political bands which have "⟧
⟵ 450-t

```
        Indices=",50;,47.619;,28.571;,28.571;,26.19;,28.571;,42.857;,45.238;,26.19;,26.19;,47.619;,42.857;,52.381
450-ge ,50;,38.095;,26.19;,69.048;,50;,28.571;,42.857;,50;,23.81;,50;,45.238;,47.619;,42.857;">
        </Glyphs>
440-s  <Path Data="M 70.584,53.064 L 541.63,53.064 L 541.63,64.584 L 70.584,64.584 L 70.584,53.064 Z ">
        <Path.Fill>
         <SolidColorBrush Color="#FFFF0003"/>
440-e  </Path.Fill>                                         440-i
        </Path>
452-ps <Path Data="M 72.024,52.344 L 533.47,52.344 L 533.47,64.344 L 72.024,64.344 L 72.024,52.344 Z ">
        <Path.Fill>
         <SolidColorBrush Color="#FF00FF04"/>
452-pe </Path.Fill>                                         452-i
        </Path>                                                      452-c
452-gs <Glyphs Name="a6" BidiLevel="0" Fill="#FFFFFFFC"
        FontUri="/Resources/2BC653E6-393C-2C0D-AD32-842F083DD225.odttf"
        FontRenderingEmSize="10.08" StyleSimulations="None" OriginX="72.024"   452-t
        OriginY="61.944"
         UnicodeString="connected them with another, and to assume among the powers of the earth, the
         separate and equal station to which "

Indices=",42.857;,47.619;,52.381;,52.381;,42.857;,42.857;,28.571;,42.857;,50;,26.19;,26.19;,52.381;,42.85
        7;,76.19;,26.19;,69.048;,28.571;,26.19;,50;,26.19;,42.857;,52.381;,47.619;,26.19;,52.381;,40.476;,35.714;,
        23.81;,26.19;,42.857;,50;,50;,23.81;,28.571;,47.619;,26.19;,45.238;,38.095;,38.095;,50;,78.571;,42.857;,23
        .81;,45.238;,78.571;,45.238;,52.381;,47.619;,26.19;,26.19;,52.381;,42.857;,26.19;,50;,47.619;,71.429;,42.8
        57;,35.714;,38.095;,26.19;,47.619;,30.952;,26.19;,28.571;,52.381;,40.476;,26.19;,42.857;,42.857;,35.714;,
        26.19;,50;,26.19;,23.81;,26.19;,52.381;,42.857;,26.19;,38.095;,42.857;,50;,42.857;,33.333;,45.238;,28.571;
        ,42.857;,23.81;,42.857;,52.381;,47.619;,26.19;,42.857;,50;,50;,42.857;,28.571;,26.19;,38.095;,26.19;,45.23
452-ge 8;,26.19;,28.571;,47.619;,50;,26.19;,28.571;,47.619;,26.19;,69.048;,52.381;,28.571;,40.476;,50;">
        </Glyphs>
440-s  <Path Data="M 70.584,64.584 L 541.63,64.584 L 541.63,76.104 L 70.584,76.104 L 70.584,64.584 Z ">
        <Path.Fill>
         <SolidColorBrush Color="#FFFF0003"/>
440-e  </Path.Fill>                                         440-i
        </Path>
454-ps <Path Data="M 72.024,63.864 L 532.75,63.864 L 532.75,75.864 L 72.024,75.864 L 72.024,63.864 Z ">
        <Path.Fill>
         <SolidColorBrush Color="#FF00FF04"/>
454-pe </Path.Fill>                                         454-i
        </Path>                                                      454-c
454-gs <Glyphs Name="a7" BidiLevel="0" Fill="#FFFFFFFC"
        FontUri="/Resources/2BC653E6-393C-2C0D-AD32-842F083DD225.odttf"
        FontRenderingEmSize="10.08" StyleSimulations="None" OriginX="72.024"
        OriginY="73.464"
         UnicodeString="the Laws of Nature and of Nature's God entitle them, a decent respect to the opinions of
         mankind requires that they"
                                                                  454-t
```

Indices=",26.19;,52.381;,42.857;,26.19;,59.524;,45.238;,69.048;,38.095;,26.19;,50;,30.952;,26.19;,71.429;,
45.238;,28.571;,47.619;,35.714;,42.857;,23.81;,42.857;,52.381;,47.619;,26.19;,47.619;,30.952;,26.19;,71.4
29;,45.238;,28.571;,47.619;,35.714;,42.857;,19.048;,38.095;,26.19;,71.429;,47.619;,50;,26.19;,40.476;,52.
381;,28.571;,26.19;,28.571;,28.571;,42.857;,23.81;,26.19;,52.381;,42.857;,76.19;,26.19;,23.81;,45.238;,26.
19;,50;,42.857;,42.857;,42.857;,50;,28.571;,23.81;,35.714;,42.857;,38.095;,50;,42.857;,42.857;,28.571;,26.
19;,28.571;,47.619;,26.19;,26.19;,52.381;,40.476;,26.19;,47.619;,50;,28.571;,50;,28.571;,47.619;,52.381;,3
5.714;,26.19;,47.619;,30.952;,26.19;,78.571;,42.857;,52.381;,50;,26.19;,50;,50;,23.81;,35.714;,42.857;,50;,
47.619;,26.19;,35.714;,42.857;,38.095;,26.19;,26.19;,50;,45.238;,26.19;,26.19;,26.19;,52.381;,42.857;">
</Glyphs>
<Glyphs Name="a8" BidiLevel="0" Fill="#FFFFFFFC"
FontUri="/Resources/2BC653E6-393C-2C0D-AD32-842F083DD225.odttf"
FontRenderingEmSize="10.08" StyleSimulations="None" OriginX="532.75"
OriginY="73.464" UnicodeString=" " Indices="">
</Glyphs>

440-s <Path Data="M 70.584,76.104 L 541.63,76.104 L 541.63,95.064 L 70.584,95.064 L 70.584,76.104 Z ">
<Path.Fill>
<SolidColorBrush Color="#FFFF0003"/>  ← 440-i
440-e </Path.Fill>
</Path>

448-ps <Path Data="M 72.024,75.624 L 319.08,75.624 L 319.08,87.624 L 72.024,87.624 L 72.024,75.624 Z ">
<Path.Fill>
<SolidColorBrush Color="#FF00FF04"/>  ← 448-i   ─ 448-c
448-pe </Path.Fill>
</Path>

448-gs <Glyphs Name="a9" BidiLevel="0" Fill="#FFFFFFFC"
FontUri="/Resources/2BC653E6-393C-2C0D-AD32-842F083DD225.odttf"
FontRenderingEmSize="10.08" StyleSimulations="None" OriginX="72.024"
OriginY="85.224"   ─ 448-t
UnicodeString="should declare the causes which impel them to the separation."

Indices=",38.095;,52.381;,47.619;,50;,28.571;,50;,23.81;,50;,42.857;,42.857;,28.571;,42.857;,35.714;,42.8
57;,26.19;,26.19;,52.381;,40.476;,26.19;,42.857;,45.238;,50;,38.095;,42.857;,38.095;,26.19;,69.048;,52.38
1;,28.571;,40.476;,52.381;,23.81;,28.571;,78.571;,50;,42.857;,26.19;,26.19;,26.19;,52.381;,40.476;,78.571;
,23.81;,28.571;,47.619;,26.19;,26.19;,52.381;,26.19;,38.095;,42.857;,50;,42.857;,33.333;,45.238;,2
8.571;,28.571;,45.238;,50;">
448-ge </Glyphs>
410-e </Canvas>
</FixedPage>

CREATING HIGH FIDELITY PAGE LAYOUT DOCUMENTS

TECHNICAL FIELD

One embodiment is directed generally to a computer system, and, in particular, to a computer system that creates high fidelity page layout documents.

BACKGROUND

Generally, a software application stores information in files that have a particular format. For many personal productivity applications, such as word processors, spreadsheet applications, presentation applications, etc., these files are known as documents, and are stored in non-volatile computer memory, such as a local hard disk, a network hard disk, etc. When a user modifies the content or formatting of a document, the software application adjusts the presentation of the document on the user's display to reflect those changes. Documents that store and present information in this manner are known as reflowable documents. Reflowable document formats include DOCX, HTML, XML, etc.

When the user prints the document, the software application or utility program converts the reflowable document into a fixed page layout document that defines the location and appearance of the document's content on the printed page. The fixed page layout document is processed and sent to the printer by a printer driver. Fixed page layout formats include PDF, XPS, OpenXPS, etc. Fixed page layout documents do not support reflow, and generally do not support significant editing by the user. Because semantic and structural information contained within a reflowable document may be lost after conversion to a fixed page layout format, further post processing or editing beyond viewing or printing becomes problematic.

SUMMARY

A computer-based method for creating a high fidelity page layout document is provided. The method includes assigning an identifier to each element of a plurality of elements in a reflowable document, creating a fixed page layout document, including the identifiers, from the reflowable document, parsing the fixed page layout document into a plurality of elements based on the identifiers, each element being associated with an identifier, linking the elements of the reflowable document to the elements of the fixed page layout document based on the identifiers, and creating a final document based on the reflowable document, the fixed page layout document and the identifiers, each element of the final document having a fixed position on a page.

BRIEF DESCRIPTION OF THE DRAWINGS

FIGS. 4A and 4B depict the contents of an XML file, in accordance with an embodiment of the present invention.

FIGS. 6A, 6B and 6C depict the contents of an XML file, in accordance with an embodiment of the present invention.

FIGS. 8A, 8B, 8C and 8D depict the contents of an XML file, in accordance with an embodiment of the present invention.

FIG. 9 depicts a high fidelity document, in accordance with an embodiment of the present invention.

DETAILED DESCRIPTION

Figure 1:
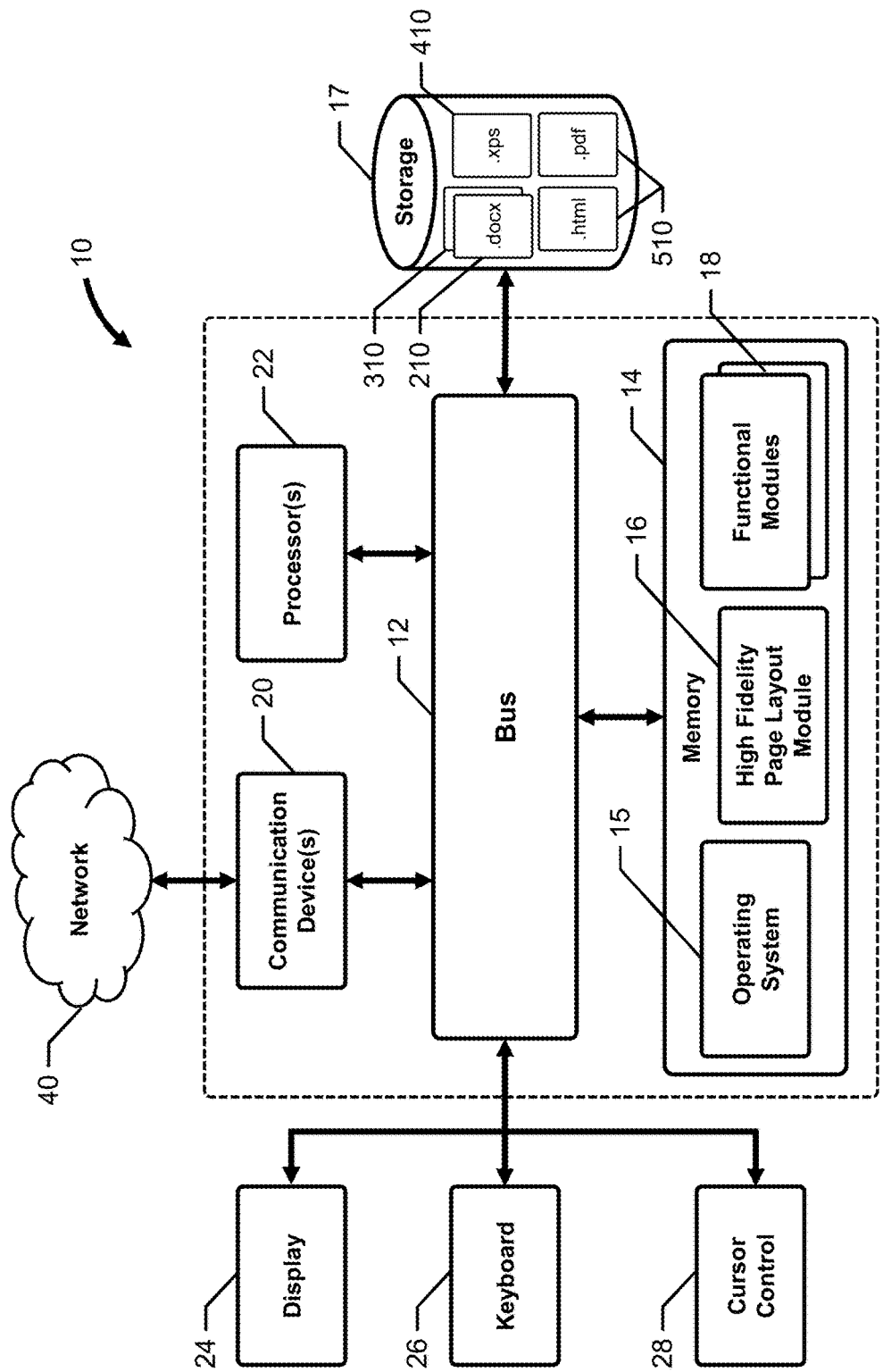
FIG. 1 is a block diagram of a computer server/system, in accordance with an embodiment of the present invention.

Embodiments of the present invention will now be described with reference to the drawing figures, in which like reference numerals refer to like parts throughout.

Embodiments of the present invention advantageously provide an improved approach to the page layout process. Structural and semantic information is retrieved from a reflowable version of a document, and combined with page layout information retrieved from a fixed page layout version of the document to create a final, high fidelity page layout version of the document. More particularly, the elements in the reflowable version of the document are linked to the elements in the fixed page layout version of the document using identifiers, which allow the structural and semantic information to be combined with the fixed page layout information on an element by element basis.

The need to convert reflowable documents into a fixed page layout version occurs all the time. For example, there are numerous competing eBook formats with fixed page layouts. Given that significant numbers of documents and books are being prepared using Microsoft Word, converting these Word documents into various other formats is in high demand. Additionally, mobile devices often use fixed page layout formats, which are typically pre-rendered on a server, rather than the mobile device itself, due to the complexity of the rules controlling the rendering of the pages.

FIG. 1 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of a user client, system 10 may be a smartphone that includes a processor, memory and a display, but may not include one or more of the other components shown in FIG. 1.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of storage devices, such as, for example, random access memory ("RAM"), read only memory ("ROM"), static storage devices such as a magnetic or optical disk, or any other type of computer readable media. System 10 further includes a communication device 20, such as a network interface card, to provide access to one or more networks 40. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media. Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a high fidelity page layout module 16 for creating high fidelity page layout documents, and all other functionality disclosed herein. System 10 can include other functional modules 18, such as, for example, a personal productivity application, a database management system, etc. Alternatively, high fidelity page layout module 16 may be included within one of the functional modules 18. A storage device 17, such as a hard disk, may be coupled to bus 12 to provide, inter alia, centralized storage for operating system 15, high fidelity page layout module 16, functional modules 18, data files, documents in various formats, such as, for example, *.docx documents 210, *.xps documents 310, *.html documents 410, *.pdf documents 510, etc. System 10 can be part of a larger system, and one or more clients may connect to the communication device 20 through one or more intervening networks (not shown), such as, for example, a Local Area Network (LAN), a Wide Area Network (WAN), a wireless network (Wi-Fi), the Internet, etc.

Figure 2:
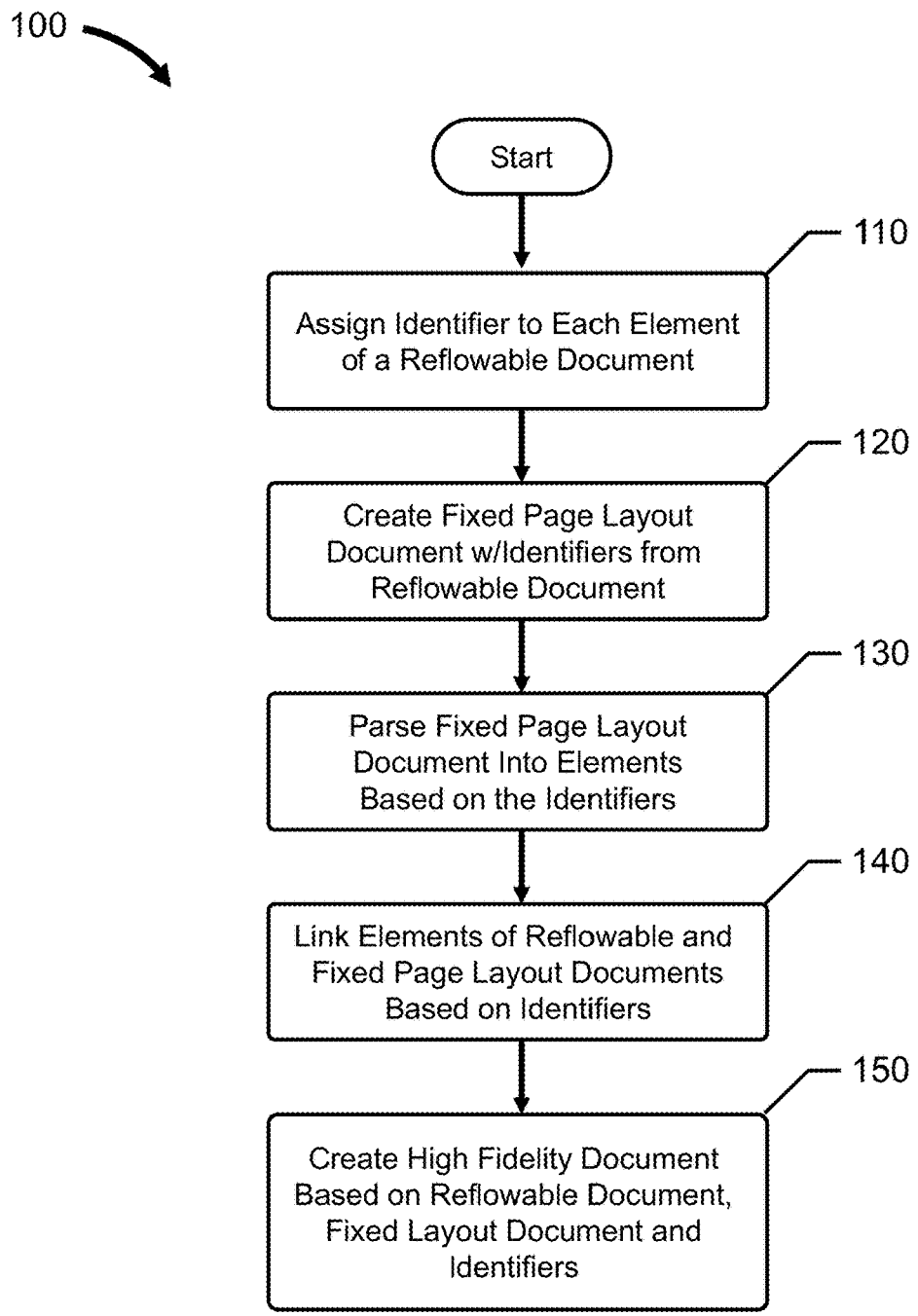
FIG. 2 is a flow diagram of the functionality of a high fidelity page layout module of FIG. 1, in accordance with an embodiment of the present invention.

FIG. 2 is a flow diagram 100 depicting at least some of the functionality of the high fidelity page layout module 16 of FIG. 1, in accordance with an embodiment of the present invention. In some embodiments, the functionality of flow diagram 100 may be implemented by software stored in memory or other computer readable, tangible non-transitory medium, and executed by one or more processors. In other embodiments, the functionality may be performed by hardware, such as, for example, an application specific integrated circuit (ASIC), a programmable gate array (PGA), a field programmable gate array (FPGA), etc., or through any combination of hardware and software.

The functionality of flow diagram 100 creates a high fidelity page layout document, and includes several elements. An identifier is assigned (element 110) to each element of a plurality of elements in a reflowable format document. A fixed page layout format document, including the identifiers, is created (element 120) from the reflowable format document. The fixed page layout format document is then parsed (element 130) into a plurality of elements based on the identifiers, each element being associated with an identifier. The elements of the reflowable format document are linked (element 140) to the elements of the fixed page layout format document based on the identifiers. A high fidelity document is then created (element 150) based on the reflowable format document, the fixed page layout format document and the identifiers, each element of the high fidelity document having a fixed position on a page.

While the many features and advantages of the present invention are discussed with respect to a word processing application document, i.e., a Microsoft Word document, the present invention is not limited to this context, and may be applied, generally, to any reflowable document. In one embodiment, the high fidelity page layout module 16 is an "add-in" to Microsoft Word, while in another embodiment, the functionality embodied within the high fidelity page layout module 16 is intrinsic to Microsoft Word. In yet another embodiment, the high fidelity page layout module 16 is a stand-alone application that executes on local computer server/system 10, on a remote computer server/system, etc.

Figure 3:
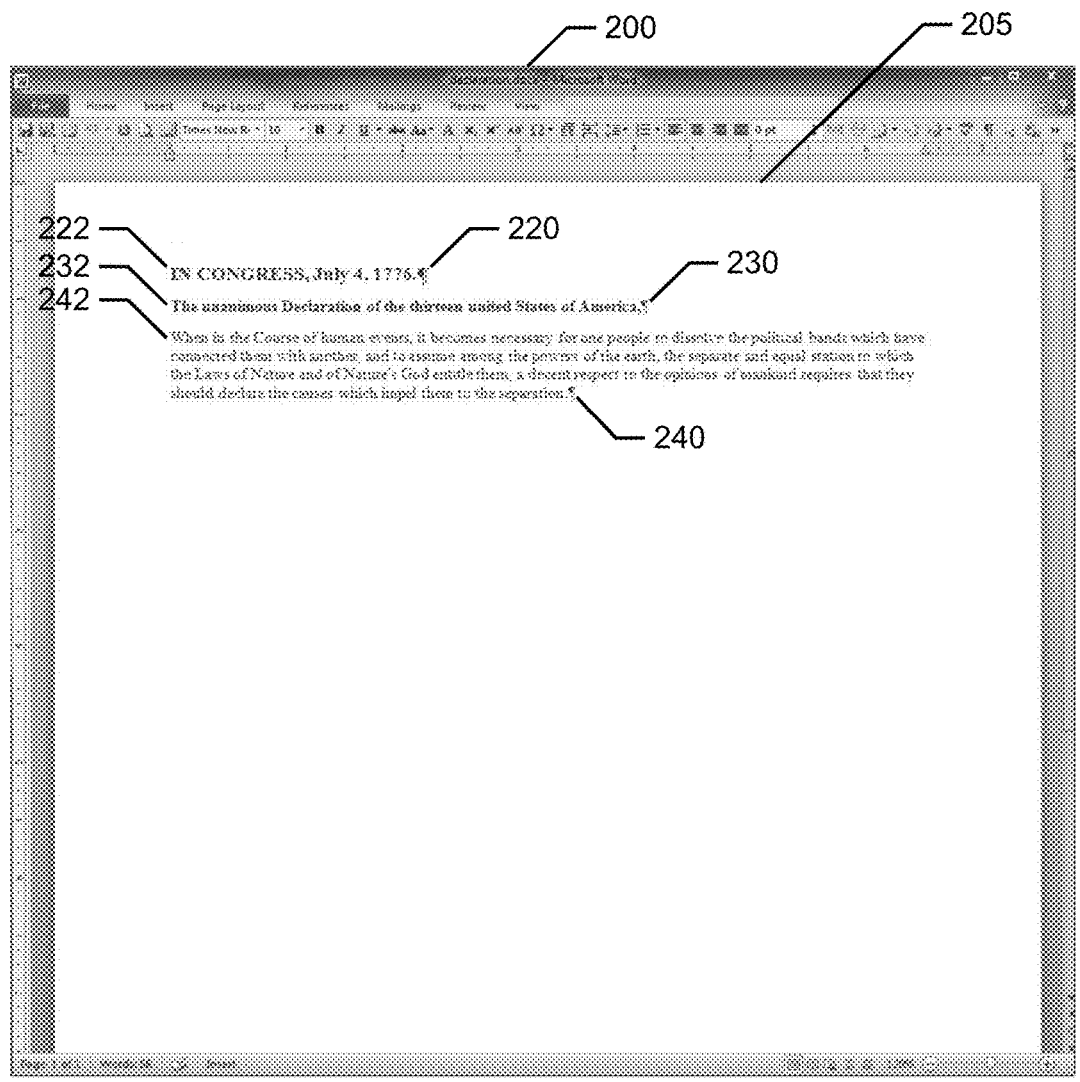
FIG. 3 presents a Microsoft Word window, in accordance with an embodiment of the present invention.

FIG. 3 presents a Microsoft Word window 200 in which a Microsoft Word document is displayed in print layout view 205. Generally, Microsoft Word documents are reflowable format documents, and document 210 is stored as "declaration.docx" on storage device 17, for example, in OpenXML WordprocessingML format, which is a ZIP container file or package that includes various XML files. Document 210 includes paragraphs 220, 230 and 240. Paragraph 220 includes run 222, which includes the formatted text "In CONGRESS, Jul. 4, 1776.". Paragraph 230 includes run 232, which includes the formatted text "The unanimous Declaration of the thirteen united States of America,". Paragraph 240 includes run 242, which includes the formatted text "When in the Course of human events, it becomes necessary for one people to dissolve the political bands which have connected them with another, and to assume among the powers of the earth, the separate and equal station to which the Laws of Nature and of Nature's God entitle them, a decent respect to the opinions of mankind requires that they should declare the causes which impel them to the separation."

FIGS. 4A and 4B depict the contents of the "document.xml" file that is stored within document 210. The elements defining the document are specified between the document start element 210-s, i.e., <w:document . . . > and the document end element 210-e, i.e., </w:document>.

The elements defining paragraph 220 are specified between the paragraph start element 220-s, i.e., <w:p . . . >, and the paragraph end element 220-e, i.e., </w:p>. Paragraph 220 includes a color element 220-c that sets the text color to a dark shade of grey, i.e., <w:color w:val="463E3E"/>. Paragraph 220 includes a single run 222, whose elements are specified between the run start element 222-s, i.e., <w:r>, and the run end element 222-e, i.e., </w:r>. Run 222 includes a color element 222-c that sets the text color to a dark shade of grey, i.e., <w:color w:val="463E3E"/>, and a text element 222-t that defines the text for the run, i.e., "In CONGRESS, Jul. 4, 1776". Hexadecimal color value "463E3E" corresponds to an RGB color distribution of 27.45% red, 24.31% green and 24.31% blue, or RGB values of 70, 62, 62, respectively. The hexadecimal color values for black, white, red and "green 1" are "000000", "FFFFFF", "FF0000" and "00FF00", respectively.

The elements defining paragraph 230 are specified between the paragraph start element 230-s, i.e., <w:p . . . >, and the paragraph end element 230-e, i.e., </w:p>. Paragraph 230 includes a single run 232, whose elements are specified between the run start element 232-s, i.e., <w:r>, and the run end element 232-e, i.e., </w:r>. Run 232 includes a color element 232-c that sets the text color to a dark shade of grey, i.e., <w:color w:val="463E3E"/>, and a text element 232-t that defines the text for the run, i.e., "The unanimous Declaration of the thirteen united States of America,".

The elements defining paragraph 240 are specified between the paragraph start element 240-s, i.e., <w:p . . . >, and the paragraph end element 240-e, i.e., </w:p>. Paragraph 240 includes a single run 242, whose elements are specified between the run start element 242-s, i.e., <w:r>, and the run end element 242-e, i.e., </w:r>. Run 242 includes a color element 242-*c* that sets the text color to a dark shade of grey, i.e., <w:color w:val="463E3E"/>, and a text element 242-*t* that defines the text for the run, i.e., "When in the Course of human events, it becomes necessary for one people to dissolve the political bands which have connected them with another, and to assume among the powers of the earth, the separate and equal station to which the Laws of Nature and of Nature's God entitle them, a decent respect to the opinions of mankind requires that they should declare the causes which impel them to the separation."

In this embodiment, the shading/background color for each paragraph and run of document 210 is not defined.

In response to a user command, the high fidelity page layout module 16 begins creating a high fidelity document from the reflowable document. In one embodiment, the high fidelity page layout module 16 first instructs the operating system to copy document 210, and then store the copy, e.g., document 310, on storage device 17, for example, in OpenXML WordprocessingML format. In this embodiment, the document 310 may be named "declaration.coloured.docx"; other names or naming conventions are also contemplated. In another embodiment, high fidelity page layout module 16 operates directly on document 210 by modifying the document as described below, and then reverses the modifications to document 210 after the high fidelity page layout document has been created.

Figure 5:
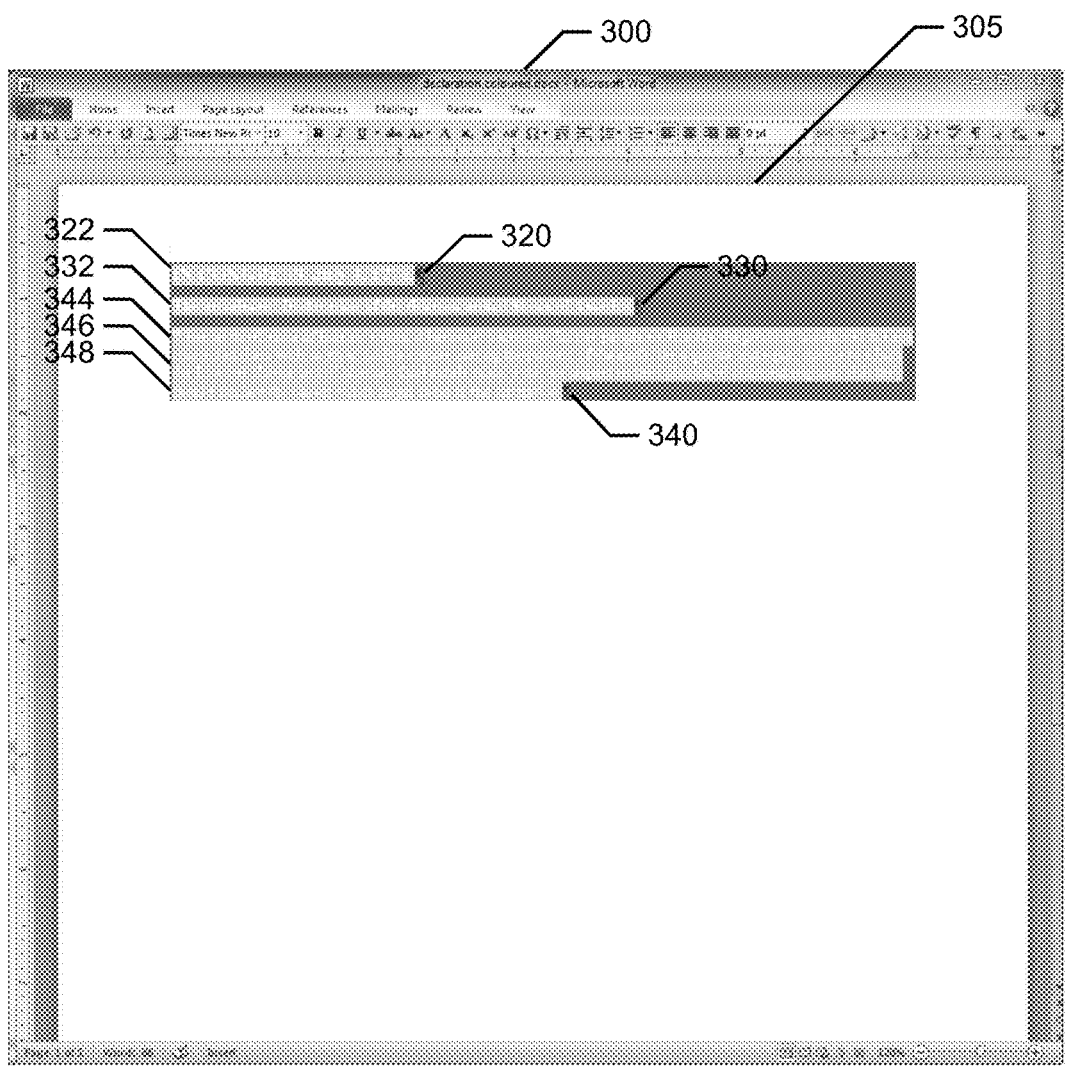
FIG. 5 presents a Microsoft Word window, in accordance with an embodiment of the present invention.

An identifier is then assigned (element 110 of FIG. 2) to each element of reflowable format document 310. An element is a paragraph, a run, a table, graphic, etc. FIG. 5 presents a Microsoft Word window 300 in which the reflowable format document 310 is displayed in print layout view 305. Generally, the identifier chosen should not affect the layout of the reflowable format document or the fixed page layout format document, and the identifier must not be affected by the transformation to the final, high fidelity document. In one embodiment, shading/background color is used as the identifier, while in another embodiment, text color is used as the identifier. Other identifiers are also contemplated, and, in a further embodiment, more than one identifier may be used for each element, such as, for example, shading/background color and text color.

As depicted in FIG. 5, shading/background color has been applied to the elements of document 310 as the identifier. Document 310 includes paragraphs 320, 330 and 340, corresponding to paragraphs 220, 230 and 240 from document 210. Paragraphs 320, 330 and 340 have been shaded using various red hues, as discussed below. The text color for each paragraph has not been changed.

Paragraph 320 includes run 322, corresponding to run 222 from document 210. Run 322 includes the text "IN CONGRESS, Jul. 4, 1776.". This run has been shaded in a green hue, and the text color has been changed to an off-white hue, as discussed below.

Paragraph 330 includes run 332, corresponding to run 232 in document 210. Run 232 includes the text "The unanimous Declaration of the thirteen united States of America,". This run has been shaded in a green hue, and the text color has been changed to an off-white hue, as discussed below.

Paragraph 340 includes runs 344, 346 and 348, which were created from run 242 in document 210. Run 344 includes the text "When in the Course of human events, it becomes necessary for one people to dissolve the", run 344 includes the text "political bands which have connected them with another, and to assume among the powers of the earth, the separate and equal station to which the Laws of Nature and of Nature's God entitle them, a decent respect to the opinions of mankind requires that they", and run 348 includes the text "should declare the causes which impel them to the separation.". These runs have been shaded in a green hue, and the text color has been changed to an off-white hue, as discussed below.

Figure 6B:
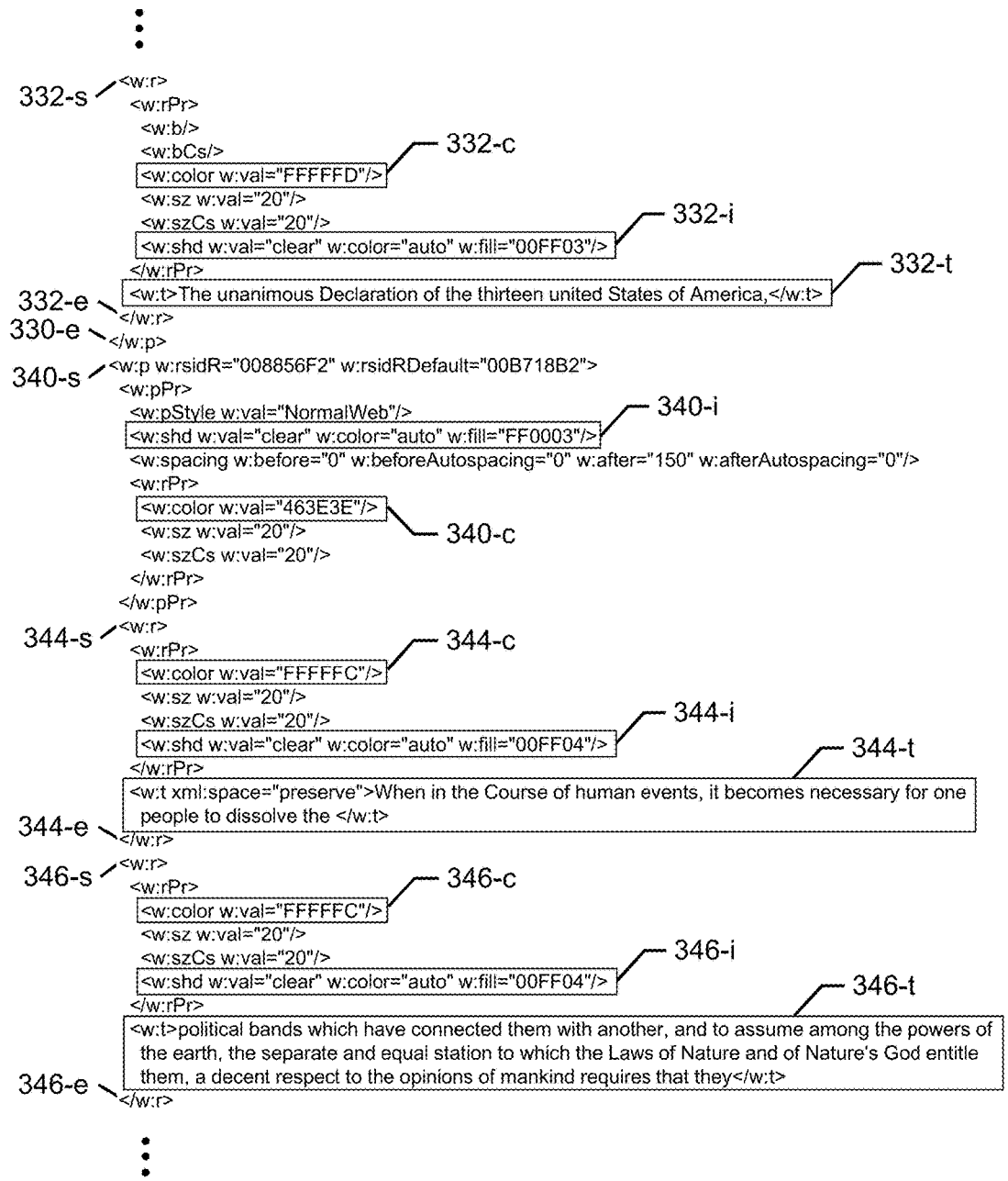

FIGS. 6A, 6B and 6C depict the contents of the "document.xml" file that is stored within document 310. The elements defining the document are specified between the document start element 310-*s*, i.e., <w:document . . . > and the document end element 310-*e*, i.e., </w:document>.

The elements defining paragraph 320 are specified between the paragraph start element 320-*s*, i.e., <w:p . . . >, and the paragraph end element 320-*e*, i.e., </w:p>. Paragraph 320 includes a color element 320-*c* that sets the text color to a dark shade of grey, i.e., <w:color w:val="463E3E"/>, and a shading element 320-*i* that sets the background color to a shade of red, i.e., <w:shd w:val="clear" w:color="auto" w:fill="FF0001"/>. It is noted that paragraph text color element 320-*c*, corresponding to paragraph text color element 220-*c*, has not changed. In other words, the text color for this paragraph is not part of the conversion process, and remains set to the value "463E3E".

Paragraph 320 includes a single run 322, whose elements are specified between the run start element 322-*s*, i.e., <w:r>, and the run end element 322-*e*, i.e., </w:r>. Run 322 includes a color element 322-*c* that sets the text color to a shade of white, i.e., <w:color w:val="FFFFFE"/>, a shading element 322-*i* that sets the background color to a shade of green 1, i.e., <w:shd w:val="clear" w:color="auto" w:fill="00FF02"/>, and a text element 322-*t* that defines the text for the run, i.e., "IN CONGRESS, Jul. 4, 1776".

The elements defining paragraph 330 are specified between the paragraph start element 330-*s*, i.e., <w:p . . . >, and the paragraph end element 330-*e*, i.e., </w:p>. Paragraph 330 includes a color element 330-*c* that sets the text color to a dark shade of grey, i.e., <w:color w:val="463E3E"/>, and a shading element 330-*i* that sets the background color to shade of red, i.e., <w:shd w:val="clear" w:color="auto" w:fill="FF0002"/>. It is noted that paragraph text color element 330-*c*, corresponding to paragraph text color element 230-*c*, has not changed. In other words, the text color for this paragraph is not part of the conversion process, and remains set to the value "463E3E".

Paragraph 330 includes a single run 332, whose elements are specified between the run start element 332-*s*, i.e., <w:r>, and the run end element 332 *e*, i.e., </w:r>. Run 332 includes a color element 332-*c* that sets the text color to a shade of white, i.e., <w:color w:val="FFFFFD"/>, a shading element 332-*i* that sets the background color to a shade of green 1, i.e., <w:shd w:val="clear" w:color="auto" w:fill="00FF03"/>, and a text element 332-*t* that defines the text for the run, i.e., "The unanimous Declaration of the thirteen united States of America,".

The elements defining paragraph 340 are specified between the paragraph start element 340-*s*, i.e., <w:p . . . >, and the paragraph end element 340-*e*, i.e., </w:p>. Paragraph 340 includes a color element 340-*c* that sets the text color to a dark shade of grey, i.e., <w:color w:val="463E3E"/>, and a shading element 340-*i* that sets the background color to shade of red, i.e., <w:shd w:val="clear" w:color="auto" w:fill="FF0003"/>. It is noted that paragraph text color element 340-*c*, corresponding to paragraph text color element 240-*c*, has not changed.

In other words, the text color for this paragraph is not part of the conversion process, and remains set to the value "463E3E".

Paragraph 340 includes three runs 344, 346 and 348. The elements for run 344 are specified between the run start element 344-s, i.e., <w:r>, and the run end element 344-e, i.e., </w:r>, the elements for run 346 are specified between the run start element 346-s, i.e., <w:r>, and the run end element 346-e, i.e., </w:r>, and the elements for run 348 are specified between the run start element 348-s, i.e., <w:r>, and the run end element 348-e, i.e., </w:r>. In this embodiment, the text color and shading/background color for all three runs have been set to the same values.

Run 344 includes a color element 344-c that sets the text color to a shade of white, i.e., <w:color w:val="FFFFFC"/>, a shading element 344-i that sets the background color to a shade of green 1, i.e., <w:shd w:val="clear" w:color="auto" w:fill="00FF04"/>, and a text element 344-t that defines the text for the run, i.e., "When in the Course of human events, it becomes necessary for one people to dissolve the".

Run 346 includes a color element 346-c that sets the text color to a shade of white, i.e., <w:color w:val="FFFFFC"/>, a shading element 346-i that sets the background color to a shade of green 1, i.e., <w:shd w:val="clear" w:color="auto" w:fill="00FF04"/>, and a text element 346-t that defines the text for the run, i.e., "political bands which have connected them with another, and to assume among the powers of the earth, the separate and equal station to which the Laws of Nature and of Nature's God entitle them, a decent respect to the opinions of mankind requires that they"

Run 348 includes a color element 348-c that sets the text color to a shade of white, i.e., <w:color w:val="FFFFFC"/>, a shading element 348-i that sets the background color to a shade of green 1, i.e., <w:shd w:val="clear" w:color="auto" w:fill="00FF04"/>, and a text element 348-t that defines the text for the run, i.e., "should declare the causes which impel them to the separation."

In this embodiment, paragraph text color does not conflict with identifiers that are assigned using paragraph or run shade color (e.g., 320-i, 322-i) or run text color (e.g., 322-c). In another embodiment, paragraph text color may be overwritten when identifiers are assigned, and then restored at step 150 (FIG. 2) using the original color information preserved in Tables 3, 4.

Figure 7:
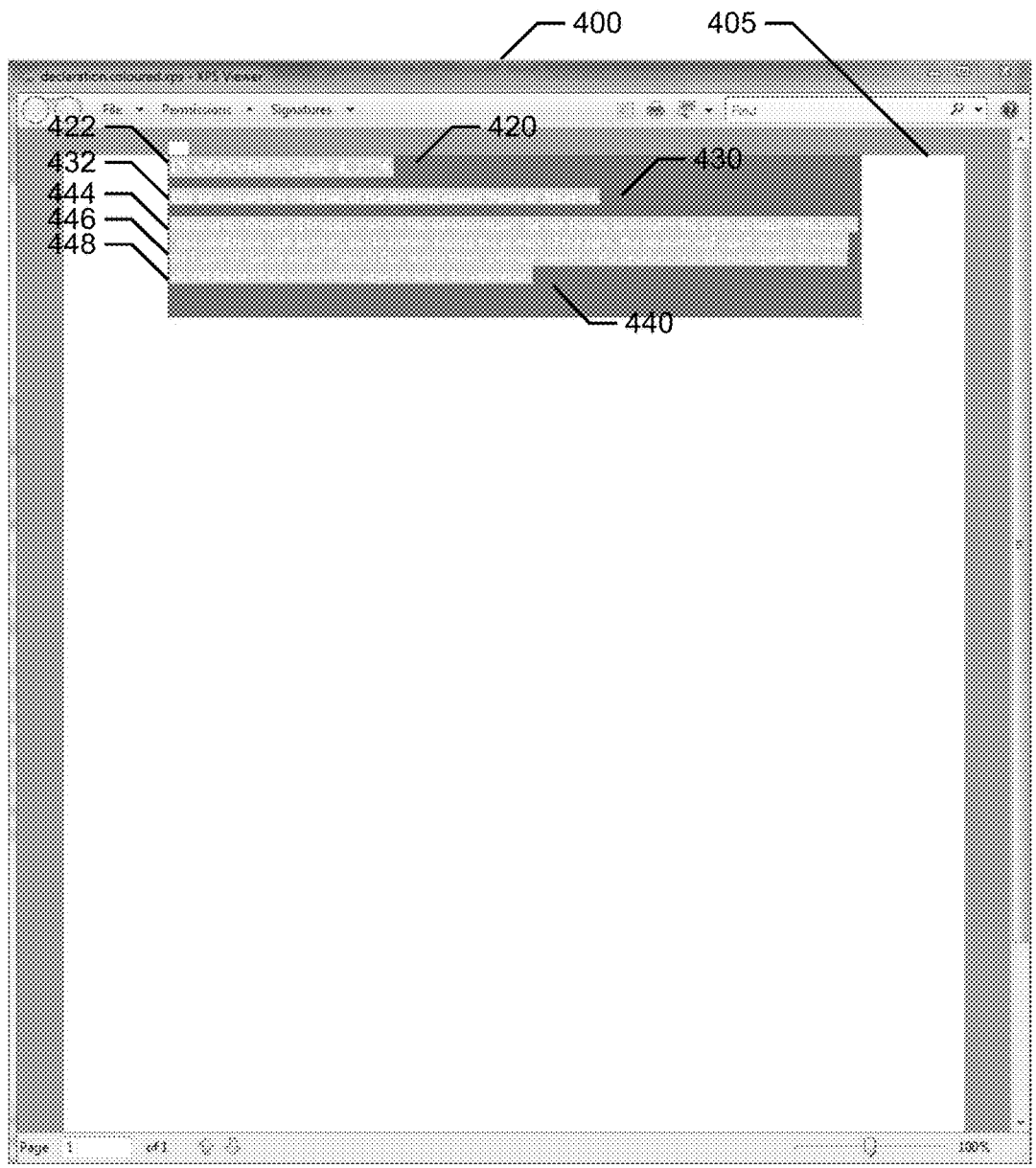
FIG. 7 presents a XPS viewer window, in accordance with an embodiment of the present invention.

A fixed page layout format document 410, including the identifiers assigned to each element, is created (element 120 of FIG. 2) from the reflowable format document 310. Document 410 is stored as "declaration.coloured.xps" on storage device 17, for example, in XPS format, which is a ZIP container file or package that includes various XML files. FIG. 7 presents a XPS viewer window 400 in which the document 410 is displayed in print layout view 405. The paragraph and run text color and shading from document 310 have been preserved.

Document 410 includes paths 420, 430 and 440 corresponding to the geometry of paragraphs 320, 330 and 340 from document 310, while paths and glyphs 422, 432, 444, 448, correspond to the geometry and text of runs 422, 432, 444 and 448 from document 310, respectively. Paths and glyphs 450, 452 and 454 correspond to the geometry and text of run 346 from document 310. A path element specifies a geometry that can be filled with a brush color, while a glyph element is used to represent a run of uniformly-formatted text from a single font.

FIGS. 8A, 8B, 8C and 8D depict the contents of the "document.xml" file that is stored within document 410. The elements defining the document are specified between the fixed page start element 410-s, i.e., <FixedPage . . . > and the document end element 410-e, i.e., </FixedPage>.

The elements defining path 420 are specified between the path start element 420-s, i.e., <Path . . . >, and the path end element 420-e, i.e., </Path>. Path 420 includes a color element 420-i that sets the solid brush color to a shade of red, i.e., <SolidColorBrush Color="#FFFF0001"/>.

The elements defining the path 422 are specified between the path start element 422-ps, i.e., <Path . . . >, and the path end element 422-pe, i.e., </Path>, while the elements defining the glyphs 422 are specified between the glyphs start element 422-gs, i.e., <Glyphs . . . >, and the glyphs end element 422-ge, i.e., </Glyphs>. Path 422 includes a color element 422-i that sets the solid brush color to a shade of green 1, i.e., <SolidColorBrush Color="#FF00FF02"/>, while Glyphs 422 includes a color element 422-c that sets a fill color for the text string to a shade of white, i.e., <Glyphs . . . Fill="#FFFFFFFE" . . . >, and text string 422-t, i.e., <Glyphs . . . UnicodeString="IN CONGRESS, Jul. 4, 1776.">.

The elements defining path 430 are specified between the path start element 430-s, i.e., <Path . . . >, and the path end element 430-e, i.e., </Path>. Path 430 includes a color element 430-i that sets the solid brush color to a shade of red, i.e., <SolidColorBrush Color="#FFFF0002"/>.

The elements defining the path 432 are specified between the path start element 432-ps, i.e., <Path . . . >, and the path end element 432-pe, i.e., </Path>, while the elements defining the glyphs 432 are specified between the glyphs start element 432-gs, i.e., <Glyphs . . . >, and the glyphs end element 432-ge, i.e., </Glyphs>. Path 432 includes a color element 432-i that sets the solid brush color to a shade of green 1, i.e., <SolidColorBrush Color="#FF00FF03"/>, while Glyphs 432 includes a color element 432-c that sets a fill color for the text string to a shade of white, i.e., <Glyphs . . . Fill="#FFFFFFFD" . . . >, and text string 432-t, i.e., <Glyphs . . . UnicodeString="The unanimous Declaration of the thirteen united States of America,">.

The elements defining path 440 are specified between several path start elements 440-s, i.e., <Path . . . >, and path end elements 430-e, i.e., </Path>. Path 440 includes color elements 440-i that set the solid brush color to a shade of red, i.e., <SolidColorBrush Color="#FFFF0003"/>.

The elements defining the path 444 are specified between the path start element 444-ps, i.e., <Path . . . >, and the path end element 444-pe, i.e., </Path>, while the elements defining the glyphs 444 are specified between the glyphs start element 444-gs, i.e., <Glyphs . . . >, and the glyphs end element 444-ge, i.e., </Glyphs>. Path 444 includes a color element 444-i that sets the solid brush color to a shade of green 1, i.e., <SolidColorBrush Color="#FF00FF04"/>, while Glyphs 444 includes a color element 444-c that sets a fill color for the text string to a shade of white, i.e., <Glyphs . . . Fill="#FFFFFFFC" . . . >, and text string 444-t, i.e., <Glyphs . . . UnicodeString="When in the Course of human events, it becomes necessary for one people to dissolve the">.

The elements defining the path 450 are specified between the path start element 450-ps, i.e., <Path . . . >, and the path end element 450-pe, i.e., </Path>, while the elements defining the glyphs 450 are specified between the glyphs start element 450-gs, i.e., <Glyphs . . . >, and the glyphs end element 450-ge, i.e., </Glyphs>. Path 450 includes a color element 450-i that sets the solid brush color to a shade of green 1, i.e., <SolidColorBrush Color="#FF00FF04"/>, while Glyphs 450 includes a color element 450-c that sets a fill color for the text string to a shade of white, i.e., <Glyphs . . . Fill="#FFFFFFFC" . . . >, and text string 450-*t*, i.e., <Glyphs . . . UnicodeString="political bands which have">.

The elements defining the path 452 are specified between the path start element 452-*ps*, i.e., <Path . . . >, and the path end element 452-*pe*, i.e., </Path>, while the elements defining the glyphs 452 are specified between the glyphs start element 452-*gs*, i.e., <Glyphs . . . >, and the glyphs end element 452-*ge*, i.e., </Glyphs>. Path 452 includes a color element 452-*i* that sets the solid brush color to a shade of green 1, i.e., <SolidColorBrush Color="#FF00FF04"/>, while Glyphs 452 includes a color element 452-*c* that sets a fill color for the text string to a shade of white, i.e., <Glyphs . . . Fill="#FFFFFFFC" . . . >, and text string 452-*t*, i.e., <Glyphs . . . UnicodeString="connected them with another, and to assume among the powers of the earth, the separate and equal station to which">.

The elements defining the path 454 are specified between the path start element 454-*ps*, i.e., <Path . . . >, and the path end element 454-*pe*, i.e., </Path>, while the elements defining the glyphs 454 are specified between the glyphs start element 454-*gs*, i.e., <Glyphs . . . >, and the glyphs end element 454-*ge*, i.e., </Glyphs>. Path 454 includes a color element 454-*i* that sets the solid brush color to a shade of green 1, i.e., <SolidColorBrush Color="#FF00FF04"/>, while Glyphs 454 includes a color element 452-*c* that sets a fill color for the text string to a shade of white, i.e., <Glyphs . . . Fill="#FFFFFFFC" . . . >, and text string 454-*t*, i.e., <Glyphs . . . UnicodeString="The Laws of Nature and of Nature's God entitle them, a decent respect to the opinions of mankind requires that they">.

The elements defining the path 448 are specified between the path start element 448-*ps*, i.e., <Path . . . >, and the path end element 448-*pe*, i.e., </Path>, while the elements defining the glyphs 448 are specified between the glyphs start element 448-*gs*, i.e., <Glyphs . . . >, and the glyphs end element 448-*ge*, i.e., </Glyphs>. Path 448 includes a color element 448-*i* that sets the solid brush color to a shade of green 1, i.e., <SolidColorBrush Color="#FF00FF04"/>, while Glyphs 448 includes a color element 448-*c* that sets a fill color for the text string to a shade of white, i.e., <Glyphs . . . Fill="#FFFFFFFC" . . . >, and text string 448-*t*, i.e., <Glyphs . . . UnicodeString="should declare the causes which impel them to the separation.">.

The fixed page layout format document is then parsed (element 130 of FIG. 2) into a plurality of elements based on the identifiers, each element being associated with an identifier.

While the reflowable document generally provides most of the element information, the fixed page layout format document provides geometrical data in order to extend the element information provided by the reflowable document. In most formats, there is an internal distinction between inline elements (e.g., lines of text) and block elements (e.g., paragraphs, tables, etc.). In HTML format, for example, SPAN elements may be used for inline elements, while DIV elements may be used for block elements. When a CSS style DISPLAY property changes the nature of the element, the distinction between inline elements and block elements still applies, although it may become less pronounced. In one embodiment, one or more tables may be prepared when parsing the fixed page layout format document. The color format is slightly different between formats, so the value is modified for compatibility with the element table from reflowable document below. For example. "#FFFF0001" becomes "FF0001," and so on.

TABLE 1

Inline Elements (glyphs from XPS document 410)

| ID (color) | Geometry (x, y) |
| --- | --- |
| FFFFFE | 72.024, 12.24 |
| FFFFFD | 72.024, 31.92 |
| . . . | . . . |

TABLE 2

Block Elements (path elements from XPS document 410)

| ID (color) | Geometry (left, top, right, bottom) |
| --- | --- |
| FF0001 | 70.584, 0, 541.63, 22.56 |
| FF0002 | 70.584, 22.56, 541.63, 41.544 |
| . . . | . . . |

XPS path element data does not contain the rectangle area listed in the block elements table, but, instead, contains a set of printer commands required to draw the rectangle or, in general, any polygon. It is noted, however, that the elements of interest always occupy a rectangular area in reflowable documents. In one embodiment, more than one XPS path element may correspond to the same color ID, and the path elements may then be combined into a single rectangular area.

The elements of the reflowable format document are linked (element 140 of FIG. 2) to the elements of the fixed page layout format document based on the identifiers.

In a similar manner, tables for the reflowable document elements may be created, in accordance with an embodiment of the present invention. Depending on the target output format of the final high fidelity document, additional element types may be collected separately as well, for example, in additional tables, lists, etc. By combining table information, the element information from the reflowable document 310 is enriched with the geometry data from fixed page layout format document 410.

TABLE 3

Inline Elements (paragraph runs from DOCX document 310)

| ID (color) | Paragraph Information |
| --- | --- |
| FFFFFE | Paragraph run information 322-s, FIG. 6A |
| FFFFFD | Paragraph run information 332-s, FIG. 6A |
| . . . | . . . |

TABLE 4

Block Elements (paragraphs from DOCX document 310)

| ID (color) | Paragraph Information |
| --- | --- |
| FF0001 | Paragraph information 320-s, FIG. 6A |
| FF0002 | Paragraph information 330-s, FIG. 6A |
| . . . | . . . |

A high fidelity document is then created (element 150 of FIG. 2) based on the reflowable format document, the fixed page layout format document and the identifiers, each element of the high fidelity document having a fixed position on a page.

In one embodiment, an iteration over all the elements of the reflowable document 310 is performed, and appropriate block or inline elements, including required geometry information, are output. In one embodiment, an HTML format with fixed element positioning is the final document target format. In this embodiment, a DIV element may be output for a paragraph, and a SPAN element may be output for each paragraph run. Geometry information would then be incorporated into style information for the DIV and SPAN. It is noted that a SPAN must be rendered as a block element using CSS style "display:block" due to the use of fixed positions. The approach with other output formats would be similar.

FIG. 9 depicts a high fidelity document 510 in PDF format, which is a fixed page layout format. In another embodiment, HTML may be used for the high fidelity document format. While HTML is a reflowable format, each element of the HTML format document is assigned a fixed position on a page, which effectively creates a fixed page layout document using a reflowable document format. In a further embodiment, an eBook file format, such as, for example, EPUB, KF8, AZW, etc., may be used for the high fidelity document format.

As disclosed above, embodiments of the present invention advantageously provide a straightforward process of converting reflowable documents into arbitrary fixed page layout format documents without performing additional geometry calculations in the process. In other words, the final fixed page layout is adapted directly from the fixed page layout format document (e.g., the XPS document), which advantageously simplifies the conversion process and produces a final document with very high fidelity.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A non-transitory computer readable medium having instructions stored thereon that, when executed by a processor, cause the processor to create a high fidelity page layout document, the creating comprising:
adding an identifier to each element of a plurality of elements in a reflowable format document, the identifier being a value for a shading color, a background color or a text color, wherein the reflowable format document comprises a file that logically specifies a positional location of each element relative to other elements when the reflowable format document is generated as a viewable form and the reflowable format document comprises a first Extensible Markup Language (XML) file and comprises multiple different identifiers, each corresponding to a different type of element;
creating a fixed page layout format document, including the identifiers, directly from the reflowable format document, the fixed page layout format document comprising a second XML file;
parsing the fixed page layout format document into a plurality of elements based on the identifiers, each element being associated with an identifier;
linking the elements of the reflowable format document to the elements of the fixed page layout format document based on the identifiers; and
creating a high fidelity page layout document directly from the reflowable format document, the fixed page layout format document and the identifiers, each element of the high fidelity page layout document having a fixed position on a page.

2. The non-transitory computer readable medium of claim 1, wherein the reflowable format is DOCX, the fixed page layout format is XPS and the high fidelity page layout document is an HTML file, a PDF file or an eBook file.

3. The non-transitory computer readable medium of claim 2, wherein the reflowable format document elements include XML paragraphs, and the identifier added to each XML paragraph is a hexadecimal value for the background color for the XML paragraph.

4. The non-transitory computer readable medium of claim 3, wherein the reflowable format document elements include XML runs, and the identifier added to each XML run is a hexadecimal value for the background color for the XML run.

5. The non-transitory computer readable medium of claim 4, wherein creating the high fidelity page layout document further comprises adding an additional identifier to each XML run, wherein the additional identifier is a hexadecimal value for the text color for the XML run.

6. The non-transitory computer readable medium of claim 1, wherein creating the high fidelity page layout document further comprises combining two or more elements of the fixed page layout format document having the same identifier into a single element in the high fidelity page layout document.

7. A computer-based method for creating a high fidelity page layout document, comprising:
adding an identifier to each element of a plurality of elements in a reflowable format document, the identifier being a value for a shading color, a background color or a text color, wherein the reflowable format document comprises a file that logically specifies a positional location of each element relative to other elements when the reflowable format document is generated as a viewable form and the reflowable format document comprises a first Extensible Markup Language (XML) file and comprises multiple different identifiers, each corresponding to a different type of element;
creating a fixed page layout format document, including the identifiers, from the reflowable format document, the fixed page layout format document comprising a second XML file;
parsing the fixed page layout format document into a plurality of elements based on the identifiers, each element being associated with an identifier;
linking the elements of the reflowable format document to the elements of the fixed page layout format document based on the identifiers; and
creating a high fidelity page layout document directly from the reflowable format document, the fixed page layout format document and the identifiers, each element of the high fidelity page layout document having a fixed position on a page.

8. The method of claim 7, wherein the reflowable format is DOCX, the fixed page layout format is XPS and the high fidelity page layout document is an HTML file, a PDF file or an eBook file.

9. The method of claim 7, wherein the reflowable format document elements include XML paragraphs, and the identifier added to each XML paragraph is a hexadecimal value for the background color for the XML paragraph.

10. The method of claim 9, wherein the reflowable format document elements include XML runs, and the identifier added to each XML run is a hexadecimal value for the background color for the XML run.

11. The method of claim 10, wherein creating the high fidelity page layout document further comprises adding an additional identifier to each XML run, wherein the additional identifier is a hexadecimal value for the text color for the XML run.

12. The method of claim 7, wherein creating the high fidelity page layout document further comprises combining two or more elements of the fixed page layout format document having the same identifier into a single element in the high fidelity page layout document.

13. A system for creating a high fidelity page layout document, comprising:
a memory; and
a processor, coupled to the memory, configured to create a high fidelity page layout document, the creating including:
adding an identifier to each element of a plurality of elements in a reflowable format document, the identifier being a value for a shading color, a background color or a text color, wherein the reflowable format document comprises a file that logically specifies a positional location of each element relative to other elements when the reflowable format document is generated as a viewable form and the reflowable format document comprises a first Extensible Markup Language (XML) file and comprises multiple different identifiers, each corresponding to a different type of element,
creating a fixed page layout format document, including the identifiers, directly from the reflowable format document, the fixed page layout format document comprising a second XML file,
parsing the fixed page layout format document into a plurality of elements based on the identifiers, each element being associated with an identifier,
linking the elements of the reflowable format document to the elements of the fixed page layout format document based on the identifiers, and
creating a high fidelity page layout document directly from the reflowable format document, the fixed page layout format document and the identifiers, each element of the high fidelity page layout document having a fixed position on a page.

14. The system of claim 13, wherein the reflowable format is DOCX, the fixed page layout format is XPS and high fidelity page layout document is an HTML file, a PDF file or an eBook file.

15. The system of claim 14, wherein the reflowable format document elements include XML paragraphs, and the identifier added to each XML paragraph is a hexadecimal value for the background color for the XML paragraph.

16. The system of claim 15, wherein the reflowable format document elements include XML runs, and the identifier added to each XML run is a hexadecimal value for the background color for the XML run.

17. The system of claim 16, wherein creating the high fidelity page layout document further comprises adding an additional identifier to each XML run, wherein the additional identifier is a hexadecimal value for the text color for the XML run.

18. The system of claim 13, wherein creating the high fidelity page layout document further comprises combining two or more elements of the fixed page layout format document having the same identifier into a single element in the high fidelity page layout document.

* * * * *